US005797181A

United States Patent [19]

Robinson

[11] Patent Number: 5,797,181

[45] Date of Patent: Aug. 25, 1998

[54] METHODS OF MANUFACTURING AUTOMOTIVE FUEL PUMPS WITH SET CLEARANCE FOR THE PUMPING CHAMBER

[75] Inventor: Barry Robinson, Williamsburg, Va.

[73] Assignee: Siemens Automotive Corporation, Auburn Hills, Mich.

[21] Appl. No.: 751,600

[22] Filed: Nov. 18, 1996

[51] Int. Cl.[6] .................................................. B23P 15/00

[52] U.S. Cl. .................................................. 29/888.024

[58] Field of Search .......................... 29/888.024, 888.02, 29/888.021, 888.022, 888.023, 888.025

[56] References Cited

U.S. PATENT DOCUMENTS

| | | | |
|---|---|---|---|
| 4,214,465 | 7/1980 | Rode | 72/36 |
| 4,974,318 | 12/1990 | Heppekausen et al. | 29/888.023 |
| 5,261,803 | 11/1993 | Freeman | 29/888.023 |
| 5,509,789 | 4/1996 | Segebrecht et al. | 29/888.023 |

*Primary Examiner*—Erick R. Solis

[57] ABSTRACT

The turbine assembly of a fuel pump includes a pair of housings having an impeller disposed between the housings with a minimum clearance. In a first form, there is provided a spacer between the housings which can be crushed between a pair of press platens such that the combined depth of the spacer and recess in one of the housings receiving the impeller equals the depth of the impeller and the minimum clearance. In another form, the housings may be precisely located and laser-welded one to the other to provide the minimum clearance between the impeller and housings. In a third form, an annular spacer is disposed between the flat faces of the opposed housings and crushed to a predetermined depth such that the spacer depth equals the depth of the impeller and the minimum clearance.

12 Claims, 3 Drawing Sheets

METHODS OF MANUFACTURING AUTOMOTIVE FUEL PUMPS WITH SET CLEARANCE FOR THE PUMPING CHAMBER

TECHNICAL FIELD

The present invention relates to the manufacture of fuel pumps, for example, for automobiles, and particularly relates to methods of manufacturing fuel pumps with minimum predetermined clearance in the pumping chamber to eliminate or at least minimize pressure drop.

BACKGROUND

Many and different types of fuel pumps have been proposed and constructed in the past. A substantial number of those pumps have comprised gear and roller vane-type pumps. The current trend, however, is to use turbine-type fuel pumps. These turbine pumps have become popular because of their increased performance, reduced noise and increased resistance to contamination.

In general, turbine-type fuel pumps comprise a pair of housings, for example, a body and a cover, and which housings define a fuel chamber therebetween. The fuel chamber constitutes a passage through the pump which decreases in cross sectional area from an inlet port in one of the housings to an outlet port in another of the housings. An impeller is disposed between the housings and is driven by a rotary shaft. Thus, the impeller suctions the fuel through the inlet port and pumps the fuel along the channel to the output port. It will be appreciated that an impeller in typical turbine-type fuel pumps turns at approximately 8,000 rpm and that clearances, given that rotational speed, must be tight in order to eliminate or minimize pressure drop in the channel. That is to say, the housings typically butt one another in an axial direction, with the impeller disposed in a circular recess between the housings, the recess being in one or both of the housings. Because the pump operates at relatively high speed and at high pressures, the clearance between the impeller and the housings must be maintained close to zero to preclude substantial pressure loss. Housings of this type are generally cast of aluminum, machined and anodized to the design clearance. While the design clearances are sometimes on the order of 1 or 2 microns, pumps manufactured using such design clearance frequently have substantial variations in the clearance with deleterious effects on the efficiency of the pump. Unless the design clearance is obtained, the efficiency of the pump decreases rather substantially. Also, the manufacturing process including the required machining and anodizing to approximate the desired clearance is expensive, and much too frequently does not obtain the desired clearance in the operating pump.

DISCLOSURE OF THE INVENTION

In accordance with the present invention, there is provided a fuel pump of the turbine type having a pair of housings and an impeller between the housings for pumping fuel from an inlet port along a channel of decreasing cross-sectional area to an outlet port. In a first form of the present invention, one of the housings includes a generally circular recess for receiving the impeller of the turbine. The depth of the recess is less than the depth of the impeller. A spacer is provided between the pair of housings, the spacer having an initial predetermined depth. The spacer is crushed in a press, however, to reduce the depth of the spacer from its initial predetermined depth to a depth wherein the combined depth of the recess and the depth of the crushed spacer is equal to the depth of the impeller plus a predetermined clearance, for example, on the order of 2 or 3 microns. By using this manufacturing technique, i.e., crushing the spacer from a spacer having an initial predetermined depth to a required depth, the spacer can be performed relatively inexpensively. The very small clearance between the impeller and the housings can thus be achieved by the present invention without the necessity of expensive machining and other finishing operations heretofore necessary, whereby a less costly and highly efficient fuel pump can be manufactured.

In a second form of the present invention, the depth of the recess in one of the housings and the depth of the impeller can be measured. With the impeller inserted into the circular recess of the one housing, the housings can be spaced from one another by measurements and laser-welded to one another. This likewise assures the desired clearance between the impeller and the housings.

In a still further form of the present invention, each of the housings may be formed with a flat face for registration with the impeller. A generally annular spacer is provided between the two housings and in part defines the flow chamber through which fuel flows from the inlet port to the outlet port. The spacer is initially provided in a predetermined depth greater than the depth of the impeller and the design clearance. By crushing the spacer between a pair of press platens, the depth of the spacer can be accurately determined and controlled such that, when the spacer is interposed between the flat faces of the housings, the clearance between the impeller and the housings can be held to a design clearance, e.g., 1 or 2 microns.

In a preferred embodiment of the invention, there is provided a method of manufacturing a fuel pump having first and second opposed turbine housings with a channel therebetween of decreasing cross-sectional area between a fuel inlet port in the first housing and a fuel outlet port in the second housing and an impeller disposed between the housings for pumping fuel between the inlet port and the outlet port, comprising the steps of forming a circular recess in a face of one of the housings having a depth A in an axial direction of the impeller; forming a flat face on another of the housings; determining the thickness B of the impeller; providing a spacer of predetermined depth; crushing the spacer to reduce the depth of the spacer from the predetermined depth to a depth C where A+C=B+ a predetermined clearance; inserting the impeller into the recess; and locating the spacer between the housing faces of the housings in face to face opposition to one another whereby the clearance between the impeller and the housings corresponds to the predetermined clearance.

In a further embodiment of the invention, there is provided a method of manufacturing a fuel pump having first and second opposed turbine housings with a channel therebetween of decreasing cross-sectional area between a fuel inlet port in the first housing and a fuel outlet port in the second housing and an impeller disposed between the housing for pumping fuel between the inlet port and the outlet port, comprising the steps of forming a circular recess in a face of one of the housings having a depth A in the axial direction of the impeller; forming a flat face on another of the housings; determining the thickness B of the impeller wherein B is greater than A; determining the desired clearance D between the housings such that the clearance between the impeller and the housings corresponds to a predetermined clearance; and laser-welding the housings to one another with the impeller located therebetween with the predetermined clearance.

In still a further embodiment of the invention, there is provided a method of manufacturing a fuel pump having first and second opposed turbine housings with a channel therebetween of decreasing cross-sectional area between a fuel inlet port in the first housing and a fuel outlet port in the second housing and an impeller disposed between the housings for pumping fuel between the inlet port and the outlet port, comprising the steps of forming housings having flat facing surfaces for spaced registration with one another when assembled to form a turbine pump with one or both of the housings having channel portions forming the channel; determining the axial depth of the impeller; providing a spacer having an initial predetermined depth; crushing the spacer to reduce the depth thereof from the predetermined depth to a depth wherein the distance between opposed faces equals the combined depth of the impeller and a predetermined clearance; and locating the spacer between the housings and the housings in opposition to one another to define in part a portion of the channel.

Accordingly, it is a primary object of the present invention to provide a novel and improved method of manufacturing an automotive fuel pump with a set clearance for the pumping chamber wherein the fuel pump may be manufactured at minimum cost, and operated with minimum pressure loss.

BEST MODE FOR CARRYING OUT THE INVENTION

Figure 1:
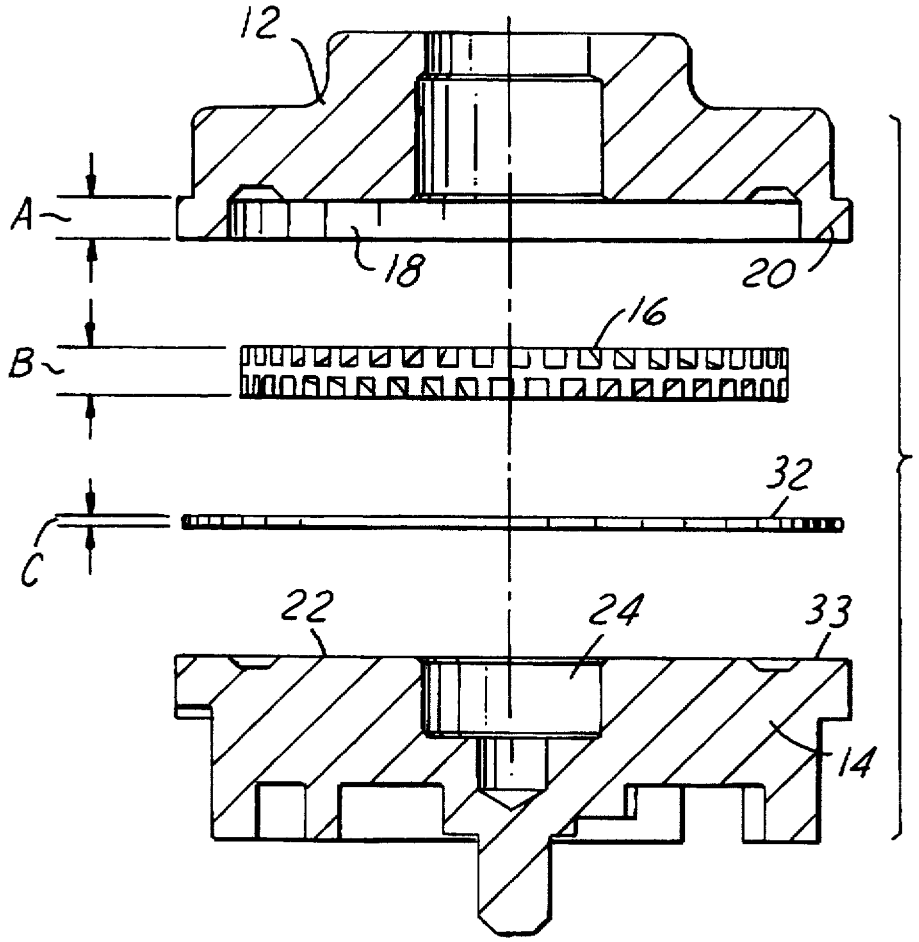
FIG. 1 is an exploded cross-sectional view through the axis of the turbine of a fuel pump illustrating the housings, impeller and spacer according to the present invention.
Figure 2:
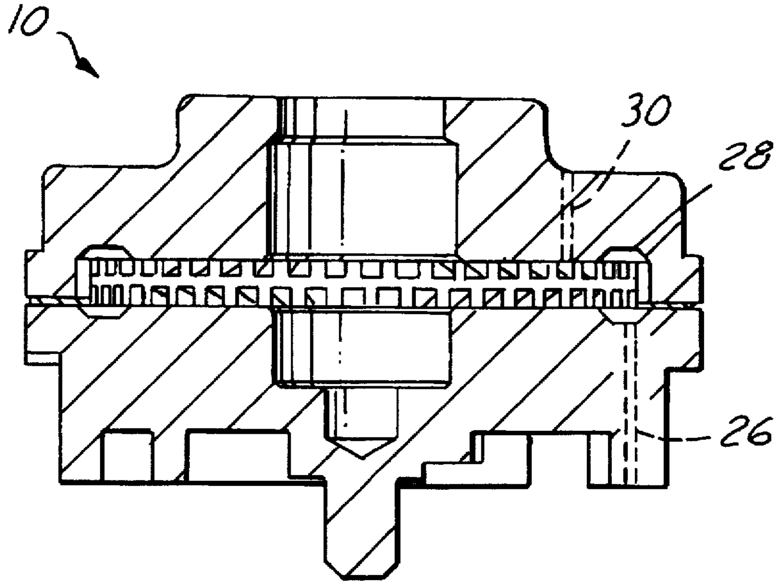
FIG. 2 is a cross-sectional view similar to FIG. 1 illustrating the turbine in assembled condition.

Referring now to the drawings, particularly to FIGS. 1 and 2, there is illustrated the turbine portion of a fuel pump. It will be appreciated that the portions of the fuel pump not shown include a motor assembly having a shaft for driving the impeller of the turbine, as well as the necessary pressure relief and check valve assemblies typical of a fuel pump. Generally, the turbine assembly is disposed in a cup of the fuel pump which also includes the motor, the motor and impeller being axially aligned whereby the motor can drive the impeller to pump the fuel. Details of the fuel pump per se are not part of the present invention.

Referring now to FIGS. 1 and 2, there is illustrated a turbine pump assembly, generally designated 10, forming part of the fuel pump, not shown, and including a pair of housings 12 and 14. One of the housings 12 is in annular form having an opening for receiving the shaft of the fuel pump motor for driving the impeller 16. The housing 12 also has a generally cylindrical recess 18 defined by outer housing flanges 20. The opposite housing 14 has a generally flat face 22 opposite recess 18 and a socket 24 for receiving the end of the motor shaft.

With reference to FIG. 2, it will be appreciated that when the housings are assembled with the impeller in the recess

18, there is also defined a chamber or flow passage by which the fuel suctioned through an inlet, schematically designated 26, may flow about a generally circular channel 28 of decreasing cross-sectional area to an outlet port, schematically illustrated at 30. That is, the flow channel 28 in communication with the inlet port 26 forms an arcuate channel of decreasing cross-sectional area about the axis of the fuel pump, terminating in the outlet port 30. Consequently, by rotating impeller 16, fuel is suctioned through inlet port 26 and pumped about the channel 28 for flow through the outlet port 30.

In accordance with the present invention, a spacer 32 is interposed between the housings 12 and 14 and particularly between the flange 20 of housing 12 and an annular flat surface portion 33 radially outwardly of a portion of the channel 28 in housing 14. From a review of FIG. 1, the depth of the recess 18 is illustrated at A and the depth of the impeller 16 is illustrated at B. It will be appreciated that the depth B of the impeller 16 is greater than the depth A of the recess 18. The problem is to manufacture the turbine pump at low cost in a manner which will afford minimum clearance between the impeller and the housings to avoid or minimize pressure losses. To achieve that end, spacer 32 is initially provided with predetermined depth larger than the depth C illustrated in FIG. 1. Also, the predetermined depth of the initial spacer is greater than the difference between depth dimensions A and B.

In accordance with the present invention, the spacer 32 is crushed, for example, by disposing the spacer between a pair of press platens to reduce its depth from its initial predetermined depth to a depth C wherein the depths A+B are equal to depth B plus a predetermined clearance. The predetermined clearance may be on the order of 1 or 2 microns. With the housings formed of cast aluminum and the spacer formed of steel, the reduction in the depth of the spacer by the relatively simple manufacturing process of crushing the spacer to a precise depth, enables the impeller 16 to be located between the flange 20 of housing 12 and the annular flat surface portion 33 of housing 14 when the housings are joined one to the other. The spacer 32 between the housings thus provides a precise minimum clearance between the impeller and housings in final assembly. In final assembly illustrated in FIG. 2, the turbine pump may be press-fitted into the cup of the fuel pump with the housings maintained together with the designed minimum clearance by the press fit.

Figure 3:
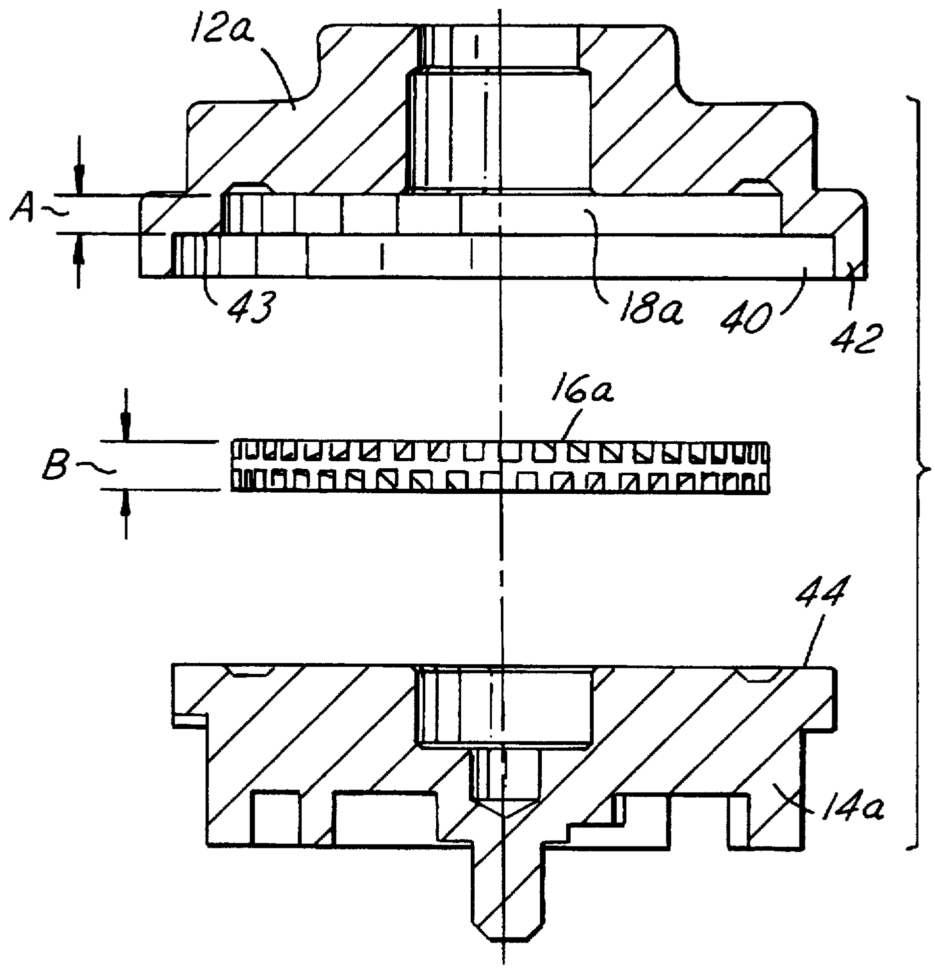
FIG. 3 is a view similar to FIG. 1 illustrating a further form of the present invention.
Figure 4:
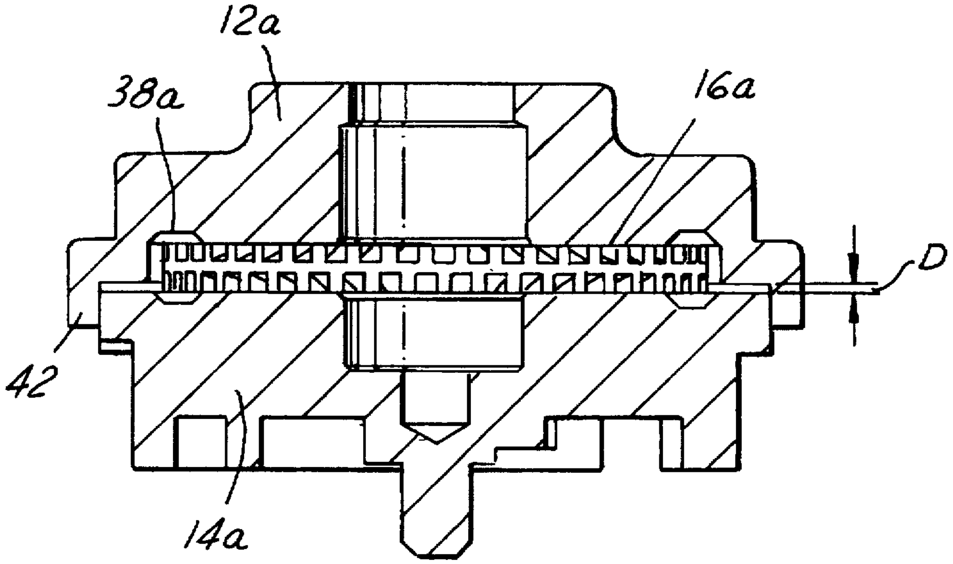
FIG. 4 is a cross-sectional view of the turbine components illustrated in FIG. 3 in an assembled condition.

Referring now to the embodiment of the invention illustrated in FIGS. 3 and 4, there are illustrated a pair of housings **12*a* and 14*a* which, in assembly as illustrated in FIG. 4, have inlet and outlet ports as well as a channel of decreasing cross-sectional area similarly as in the turbine pump of the previous embodiment. In this embodiment, however, the housing 12*a* has a cylindrical recess 18*a* for receiving the impeller 16*a* and a further stepped larger diameter cylindrical recess 40 defined by an axially directed outer flange 42. The recesses 18*a* and 40 define an annular surface 43 in opposition to housing 14*a* in final assembly. An annular surface 44 is also defined on the flat face of housing 14*a* outwardly of a portion of the chamber 38*a*. The outer flange 42 and the housing 14*a* are sized such that the entire facing portion of housing 14*a* is received within recess 40 and within flange 42**.

In order to readily and easily provide the minimum clearance between the impeller and the housings in the manufacture of the turbine assembly of FIGS. 3 and 4, the dimensions A and B are measured. Also, the position of the housings **12*a* and 14*a*** during assembly is ascertained. Thus, the impeller 16*a* (FIG. 4) is located within the recess 18*a* of housing 12*a*, and the housings are located precisely relative to one another leaving a clearance D between the annular surface 43 of housing 12*a* and the annular surface 44 of housing 14*a*, the housing 14*a* being received in the recess 40, with the flange 42 surrounding the housing 14*a*. Laser-welding is then preferably used to secure the housings in that predetermined position with minimum clearance between the impeller and the housings as in the prior embodiment. Other types of securement, however, may be used such as resistance welding, spin welding, and resistance brazing. Also, a press fit between the housings 12*a* and 14*a* may be used to achieve the desired clearance.

Figure 5:
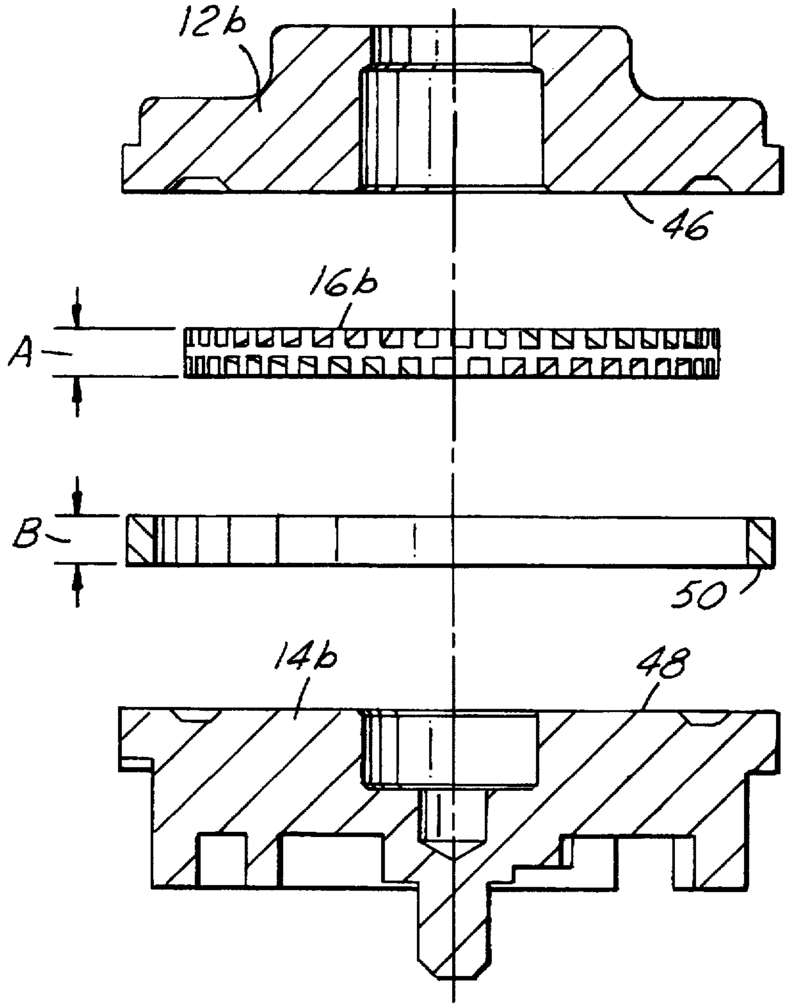
FIG. 5 is a view similar to FIG. 1 showing a further form of turbine hereof.
Figure 6:
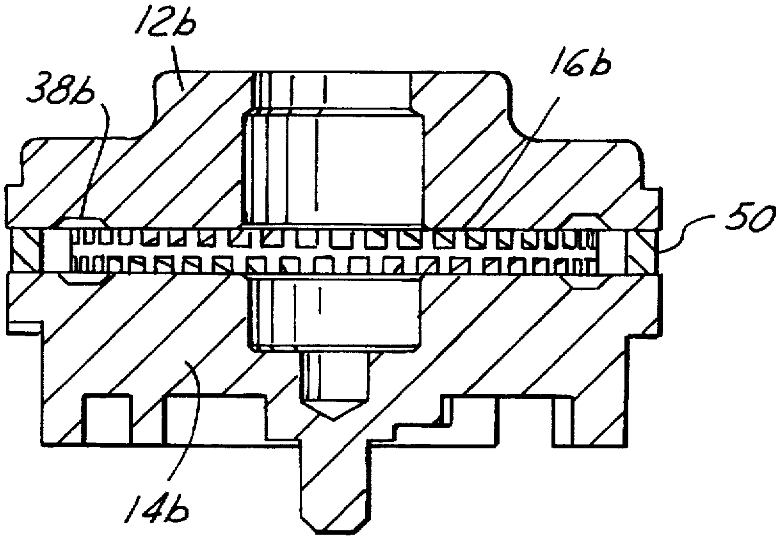
FIG. 6 is a cross-sectional view thereof illustrating the components illustrated in FIG. 5 in assembled form.

Referring now to the form of the invention illustrated in FIGS. 5 and 6, there is provided a similar pair of housings 12*b* and 14*b* having an impeller 16*b* disposed between the housings and channel portions in the faces of the housings defining channel 38*b*. In this form, the housings 12*b* and 14*b* have flat opposing surfaces 46 and 48, respectively. From a review of FIG. 5, it will be appreciated that the channel portions formed in each of the flat surfaces 46 and 48 and the housings have inlet and outlet ports, not shown in these drawing figures, similarly as in the prior two embodiments. To assemble the housings with a minimum clearance between the impeller and the housings, a spacer 50 of an initial predetermined depth B greater than the depth A of the impeller is provided. The spacer 50 may be formed of steel and is in the form of an annulus. Spacer 50 is crushed between a pair of press platens, similarly as spacer 32 at the first embodiment, to reduce its depth from an initial predetermined depth to a depth where the distance between the opposed faces of the housings equals the combined depth of impeller 16*b* and a predetermined clearance. Thus, when the spacer 50 is located between the opposed flat surfaces of the housings 12*b* and 14*b*, the minimum clearance is provided between the impeller and the housings. Note in this configuration, as well as in the first embodiment of the present invention at FIGS. 1 and 2, that the spacer defines part of the flow channel about the turbine assembly. The housings 12*b* and 14*b* can be secured to one another in this embodiment and in the prior embodiments by laser welding or by press fit within the fuel pump.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fuel pump having first and second opposed turbine housings with a channel therebetween of decreasing cross-sectional area between a fuel inlet port in said first housing and a fuel outlet port in said second housing and an impeller disposed between said housings for pumping fuel between said inlet port and said outlet port, a method of manufacturing the fuel pump, comprising the steps of:

forming a circular recess in a face of one of said housings having a depth A in an axial direction of said impeller;

forming a flat face on another of said housings;

determining the thickness B of the impeller;

providing a spacer of predetermined depth;

crushing the spacer to reduce the depth of the spacer from said predetermined depth to a depth C where A+C=B+ a predetermined clearance;

inserting said impeller into said recess; and locating said spacer between said housing faces of the housings in face to face opposition to one another whereby the clearance between the impeller and the housings corresponds to said predetermined clearance.

2. A method according to claim 1 including forming a portion of said channel in each of the faces of said housings.

3. In a fuel pump having first and second opposed turbine housings with a channel therebetween of decreasing cross-sectional area between a fuel inlet port in said first housing and a fuel outlet port in said second housing and an impeller disposed between said housing for pumping fuel between said inlet port and said outlet port, a method of manufacturing the fuel pump, comprising the steps of:

forming a circular recess in a face of one of said housings having a depth A in the axial direction of said impeller;

forming a flat face on another of said housings;

determining the thickness B of the impeller wherein B is greater than A;

determining the desired clearance D between the housings such that the clearance between the impeller and the housings corresponds to a predetermined clearance; and securing the housings to one another with the impeller located therebetween with the predetermined clearance.

4. A method according to claim 3 including forming a portion of said channel in each of the faces of said housings.

5. A method according to claim 3 wherein one of said housings has an axially extending flange overlying another of the housings and laser welding the flange and said another housing to on another.

6. A method according to claim 3 wherein the step of securing includes laser welding.

7. A method according to claim 3 wherein the step of securing includes spin welding.

8. A method according to claim 3 wherein the step of securing includes resistance welding.

9. A method according to claim 3 wherein the step of securing includes resistance brazing.

10. A method according to claim 3 wherein the step of securing includes press fitting the housings to one another.

11. In a fuel pump having first and second opposed turbine housings with a channel therebetween of decreasing cross-sectional area between a fuel inlet port in said first housing and a fuel outlet port in said second housing and an impeller disposed between said housings for pumping fuel between said inlet port and said outlet port, a method of manufacturing the fuel pump, comprising the steps of:

forming housings having flat facing surfaces for spaced registration with one another when assembled to form a turbine pump with one or both of said housings having channel portions forming said channel;

determining the axial depth of the impeller;

providing a spacer having an initial predetermined depth;

crushing the spacer to reduce the depth thereof from said predetermined depth to a depth wherein the distance between opposed faces equals the combined depth of the impeller and a predetermined clearance; and locating said spacer between said housings and said housings in opposition to one another to define in part a portion of said channel.

12. A method according to claim 11 including forming channel portions in each of the registering surfaces to define, upon assembly of the housings, the fuel channel and forming the spacer into an annular configuration.

* * * * *